United States Patent [19]
Shindo

[11] Patent Number: 5,619,670
[45] Date of Patent: Apr. 8, 1997

[54] ADDRESS DECODER WITH SMALL CIRCUIT SCALE AND ADDRESS AREA EXPANSION CAPABILITY

[75] Inventor: Keisuke Shindo, Tokyo, Japan

[73] Assignee: NEC Corporation, Tokyo, Japan

[21] Appl. No.: 280,531

[22] Filed: Jul. 26, 1994

[30] Foreign Application Priority Data

Jul. 26, 1993 [JP] Japan .................................. 5-184112

[51] Int. Cl.⁶ .......................... G06F 12/00; G06F 12/02; G06F 9/26; G06F 9/34
[52] U.S. Cl. ......................... 395/412; 395/416; 395/419; 395/413
[58] Field of Search .................................. 364/900, 200; 365/49; 395/410, 419, 412, 416, 413

[56] References Cited

U.S. PATENT DOCUMENTS

| | | | |
|---|---|---|---|
| 4,075,694 | 2/1978 | Ericsson | 364/200 |
| 4,488,256 | 12/1984 | Zolnowski et al. | 364/900 |
| 4,903,234 | 2/1990 | Sakuraba et al. | 365/49 |

FOREIGN PATENT DOCUMENTS 63-83999  4/1988  Japan .

OTHER PUBLICATIONS

Soviet Patent Abstract AN 87-248615/35, Section EI, Week 8735, Derwent Publications Ltd. Sep. 9, 1987.
Patent Abstracts of Japan, vol. 13, No. 319 (P-901), Jul. 19, 1989.
Soviet Patent Abstract AN 87-248615/35 Sep. 1987.

Primary Examiner—David K. Moore
Assistant Examiner—Than Nguyen
Attorney, Agent, or Firm—Foley & Lardner

[57] ABSTRACT

An address decoder has a plurality of address comparator circuits for respective address areas, each comparator circuit including a base address register, a mask register, an AND gate, and a comparator. An address data outputted from a processor is inputted to the address comparator where the AND circuit takes an AND logic of each bit for the address and an inverted value taken for each bit from the content of the mask register and the result is compared to a starting address of the pertinent address area stored in the base address register. If the compared data are in accord, an address decoded signal of "1" is outputted, which indicates that the address is an address within the pertinent address area. The address comparators and function in the same way as the address comparator. A priority encoder receives address decoded signals from the plurality of address comparator circuits and outputs a highest priority address decoded signal as a final output when it receives a plurality of in-accord address decoded signals. The address decoder is small in circuit scale and has address area expansion capability.

2 Claims, 4 Drawing Sheets

ADDRESS DECODER WITH SMALL CIRCUIT SCALE AND ADDRESS AREA EXPANSION CAPABILITY

BACKGROUND OF THE INVENTION

1. Field of the Invention

This invention relates to an information processing system, and more particularly to an address decoder having address area expansion capability for use in the information processing system.

2. Description of the Related Art

In a microprocessor, for performing data communication with a plurality of external devices, addresses specifying these respective external devices are outputted. Since these addresses are of encoded general-purpose signal lines, an address decoder is necessary, which causes such functions as waiting and chip-selecting with respect to the designated device according to the specified address area.

Such an address decoder may be one dedicated to each system, or one used as a general-purpose address decoder. It is desired for a system to be architected with as small a number of general-purpose chips as possible. This means that it is necessary to provide a general-purpose chip with a general-purpose address decoder so that the same circuit can provide various functions depending on systems.

To this end, an address decoder having a high degree of freedom is required, which permits address area alteration through register re-writing with the same circuit.

FIG. 1 is a block diagram showing a prior art address decoder. With this address decoder, the entire address area is divided into three division areas without overlap. The system as shown comprises a first address comparator 306 which includes an area boundary register 302 indicating a lower area boundary and a subtracter 304 for subtracting the upper three bits of address data 301 outputted from a processor or the like and the lower area boundary data; a second address comparator 307 which includes an area boundary register 303 indicating an upper area boundary and a subtracter 305 for subtracting the upper three bits of the input address data and the upper area boundary data; an AND gate 311 for taking a logical AND value of the inversion of the carry from the subtracter 304 and the carry from the subtracter 305; and an inverter 309 for inverting the carry from the subtracter 305.

The address data 301 is inputted to each of the first and second address comparators 306 and 307 to be compared in the subtracters 304 and 305, which are 3-bit subtracters, to the contents of the area boundary registers 302 and 303, which are 3-bit registers. The subtracters 304 and 305 subtract the contents of the registers 302 and 303 from the address 301 and generate the sole carries. Thus, if it is found as a result of comparison in the first address comparator 306 that the address 301 is smaller in value than the content of the address register 302, an output of "1" is outputted as an address decoded signal 310. As a result, the lower address area is selected.

If the address 301 is smaller in value than the content of the address register 303, an output "1" is outputted as an address decoded signal 311 from the AND gate 308. In this case, the middle address area is selected.

If the address 301 is larger in value than the content of the address register 303, an output of "1" is provided as an address decoded signal 312 from the inverter 309. In this case, the upper address area is selected.

FIG. 2 shows an example of address area allocation by the address decoder. The entire address space comprises three, lower, middle and upper address areas 401, 402 and 403. Assuming that the address data provided from the processor is of 16 bits, the upper three bits thereof are inputted to the address decoder.

With an address boundary value of "1" being stored in the area boundary register 302, the upper three bits of the boundary address are "1", and an area 0 of the smallest address area is from the address "0000" to the address "1FFF". Likewise, with an address boundary value of "5" being stored in the area boundary register 303, an area 1 is between the registers 302 and 303 and from the address "2000" to the address "9FFF". An area 2 is from the address "A000" to the address "FFFF".

FIG. 3 is a block diagram showing another example of the prior art address decoder. Specifically, FIG. 3 shows an example of area designation by address masking as disclosed in Japanese Patent Application Kokai Publication No. Sho 63-83999.

A mask-gate circuit 502 masks some bits of an address 501 inputted thereto, and thus the address 503 with some bits masked which is outputted to the fail-bit memory 504 designates an address area. By masking given address bits in the above way, it is possible to designate given 2's factorial areas with a restriction that the designation is from the address area frontend. In FIG. 3, designated at 505 is a write-enable (WE) signal, at 506 a data input line (Din), and at 507 a data output line (Dout).

FIG. 4 is a block diagram showing an example of a system using the above address decoders. A general-purpose processor 609 includes a central processing unit (CPU) 601, an address decoder 604 and a wait controller 603 and is connected to a memory device 602 and an input-output (I/O) device 605.

The memory device 602 and I/O device 605, which are accessed from the CPU, are uniformly assigned to the address space of the CPU 601 and, thus, the addressee, i.e., the memory device 602 or the I/O device 605 will know from a chip select signal 608 which is an output of the address decoder 604, that it has been selected. The chip select signal is also inputted to the wait controller 603 in the general-purpose processor 609 so that the wait controller 603 performs wait-controlling of the CPU 601 based on a ready signal 606 outputted therefrom depending on the selected device.

By adopting as the address decoder 604 one of the above address decoders in which the address area is dynamically determined, it is possible to assign the output of the chip select signal to a desired address location without making any change in the internal circuit in the processor 609 which is a peripheral circuit built-in processor. It is thus possible to freely cope with the assignment of the address spaces for the memory device 602 and the I/O device 605 that varies with systems.

The above prior art address decoders have the following drawbacks, respectively.

(1) First prior art example 1 (FIG. 1)

This example is based on the method that two area boundaries are stored in the registers and compared with addresses in the subtracters to decode the area from the comparison results. Therefore, one subtraction has to be done for every decoding, and further a plurality of subtracters are necessary.

Further, with an increase in the number of areas to be decoded, the number of subtracters must be increased accordingly, thus leading to an extremely great increase in the circuit scale. Therefore, the number of areas is often limited. In addition, a common use arrangement is often used for the two area boundaries.

Further, where a 32-bit address is fully to be compared, a 32-bit subtracter should be provided for each area. Subtracters or like circuits are enormously increased with increasing bit number. To suppress the circuit scale, therefore, the bit number of the subtracter is reduced with a sacrifice in the degree of freedom of the address area size.

(2) Second prior art example 2 (FIG. 3)

Since this example is based on the method which uses the address mask only, the start of the address area is always the frontend of address space, and hence the area length is fixed to the 2's factorial address length. In addition, the securing of a plurality of areas results in overlap of the portions of the adjacent areas.

For the above reasons, the degree of freedom of securing areas is extremely low, and the prior art address decoders are therefore hardly suited to the purpose of address decoding.

SUMMARY OF THE INVENTION

An object of the invention, therefore, is to overcome the problems existing in the prior art and to provide an improved address decoder, which has a smaller circuit scale compared to the prior art circuit with the same degree of freedom and has address area expansion capability.

According to one aspect of the invention, there is provided an address decoder for decoding an address outputted from a processor, the address decoder comprising:

a base address register having a same bit length as the address to be decoded, for storing therein a value of starting address of a predetermined area in an address space;

a mask register having a same bit length as the address, for storing therein a mask value;

a masking means for masking the address outputted from the processor for each bit with the mask value stored in the mask register; and a comparator for comparing a resulting value of masking conducted by the masking means and the value of starting address stored in the base address register as to whether two compared values are in accord and for outputting an address decoded signal as a result of comparison, the mask value stored in the mask register being such that the resulting value of masking conducted by the masking means is in accord with the value of starting address stored in the base address register if the address outputted from the processor is an address within the predetermined area.

According to another aspect of the invention, there is provided an address decoder comprising a plurality of address comparator circuits provided for respective areas, each comparator circuit including such address register, mask register, masking means and comparator as described above. The address decoder further includes a priority encoder which outputs an address decode signal of each of the address comparator circuits, and in doing so, when a plurality of in-accord address decoded signals are received, outputs a highest priority address decoded signal as it is, and changes the remainder to out-of-accord.

According to the invention, since no subtracter is used, the circuit scale may be small. In addition, according to the invention, since there are areas which are not decoded, it is possible to secure new address decode areas.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Now, an embodiment of the invention will be described with reference to the accompanying drawings.

Figure 5:
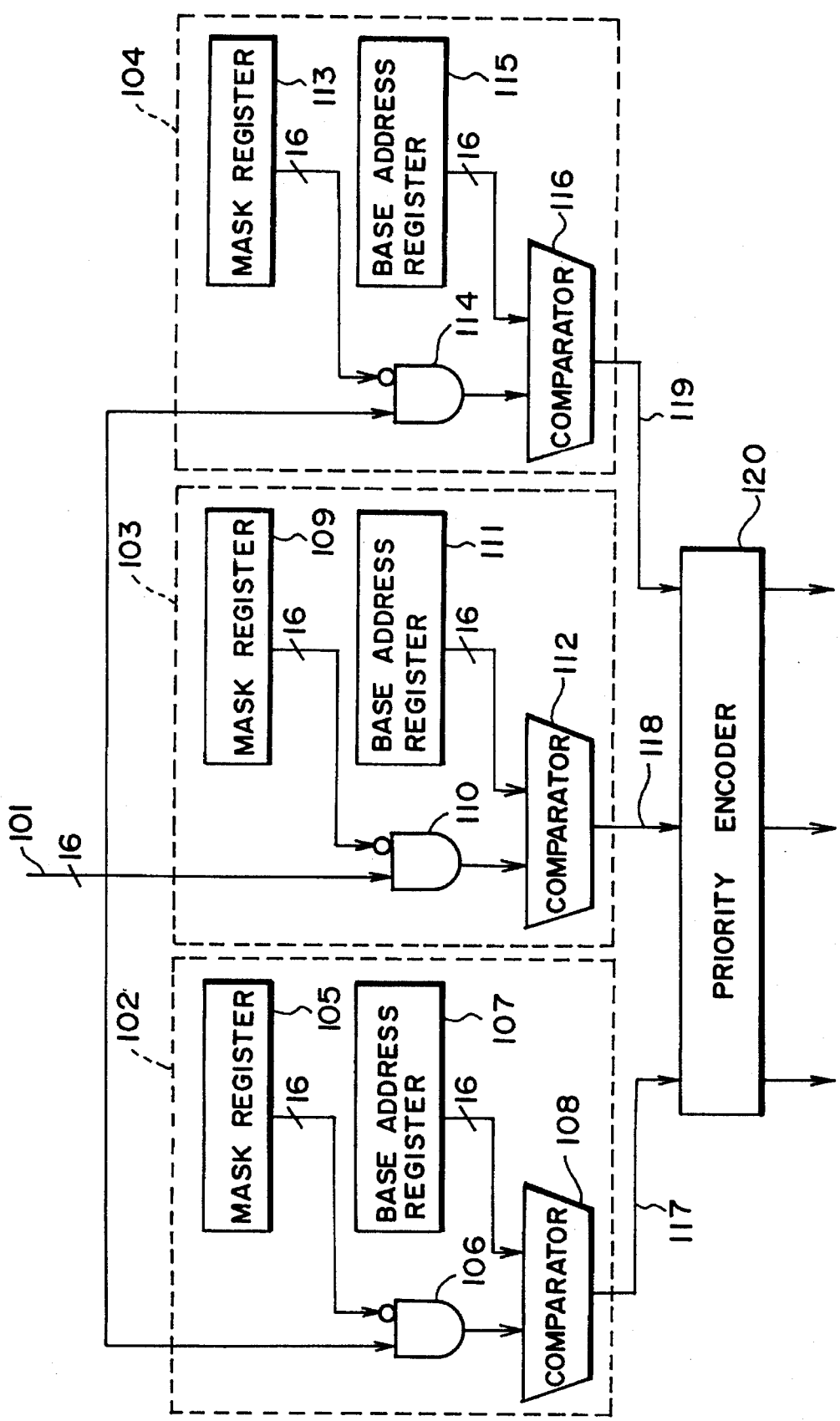
FIG. 5 is a block diagram showing an embodiment of the address decoder according to the invention.
Figure 6:
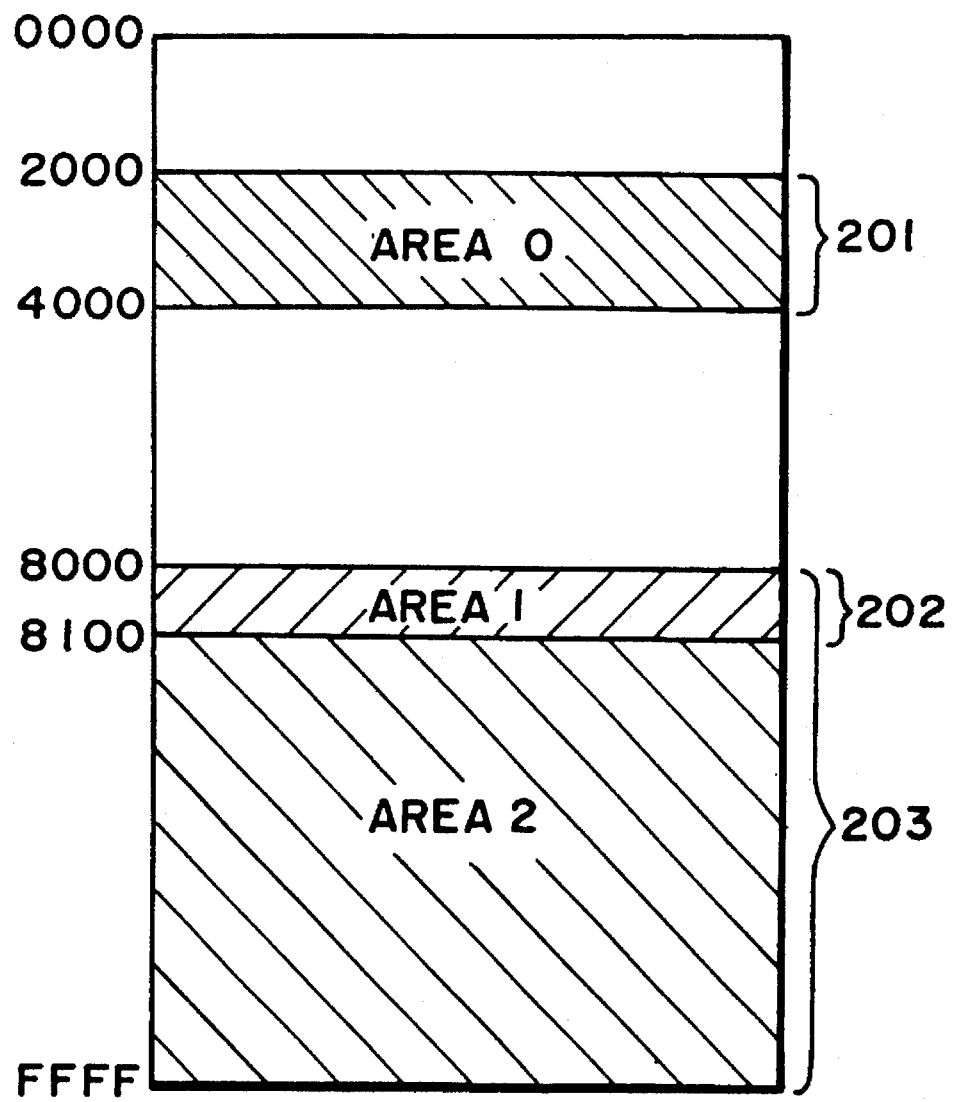
FIG. 6 is a view showing an example of address area allocation in the embodiment according to the invention.

FIG. 5 is a block diagram showing an embodiment of the address decoder according to the invention. FIG. 6 is a view showing an example of address area allocation.

In this embodiment, as shown in FIG. 6, there are three address areas to be decoded, i.e., an area 201 from the address "2000" to the address "3FFF", an area 202 from the address "8000" to the address "80FF", and an area 303 from the address "8000" to the address "FFFF". The address value is expressed as a hexadecimal number.

Referring back to FIG. 5, an address comparator circuit 102 for decoding an inputted address as to whether the address is within the area 201 is explained. The address comparator circuit 102 includes a mask register 105 storing therein a mask value "1FFF"; an AND gate (masking means) 106 for taking an AND logic of each bit for the address (16 bits) outputted from a processor and a NOT (inverted) value taken for each bit from the mask value of the mask register 105; a base address register 107 storing therein a base or starting address "2000" of the area 201; and a comparator 108 for comparing the output of the AND gate 106 and the base address "2000" of the base address register 107 and outputting an address decoded signal 117 of "1" if the two compared data are in accord.

Another address comparator circuit 103 is for decoding an inputted address as to whether the address is within the area 202, and it includes a mask register 109 with a mask value "00FF" stored therein; an AND gate for taking an AND logic of each bit for the address 101 (16 bits) outputted from the processor and a NOT value taken for each bit from the mask value of the mask register 109; a base address register 111, in which a base address "8000" of the area 202 is stored; and a comparator circuit 112 for comparing the output of the AND gate 110 and the base address "8000" of the base address register 111 and outputting an address decoded signal 118 of "1" if the two compared data are in accord.

A further address comparator circuit 104 is for decoding an inputted address as to whether the address is within the area 203. The address comparator circuit 104 includes a mask register 113 with a mask value "7FFF" stored therein; an AND gate 114 for taking an AND logic of each bit for the address 101 (16 bits) outputted from the processor and a NOT value taken for each bit from the mask value of the mask register 113; a base address register 115, in which a base address "8000" of the area 203 is stored; and a comparator 116 for comparing the output of the AND gate 114 and the base address "8000" of the base address register 115 and outputting an address decoded signal 119 of "1" if the two compared data are in accord.

As shown, in the individual address comparators 102, 103 and 104, logical AND operation is taken for each bit of the inputted address 101 and a NOT value taken for each bit from the contents of the mask registers 105, 109 and 113. Thus, the address area size may take any 2's factorial value.

The decoded results 117, 118 and 119 of the address decoding from the address comparator circuits 102, 103 and 104 contain area overlaps. Accordingly, they are inputted to a priority encoder 120, which selects the highest priority address decoded signal which is outputted as the final address decoder output.

The actual operation of this embodiment will now be described.

It is assumed that a value "3000", for instance, is inputted as the address data 101. Each of the AND gates 106, 110 and 114 takes an AND logic of each bit for the address 101 and a NOT value taken for each bit from the respective contents of the mask registers 105, 109 and 113. Thus, their outputs are "2000", "3000" and "0000", respectively. Of these outputs, only the output of the AND gate 106 is in accord with the content of the corresponding base address "2000" stored in the base address register 107. Thus, only the comparator 108 outputs the address decoded signal 117 of "1". This output is then outputted from the priority encoder 120 as the final address decoder output. Thus, it can be recognized that an address in the area 201 is outputted from the processor.

Now, it is assumed that "80F0" is inputted as the address 101. In this case, the outputs of the AND gates 106, 110 and 114 are all "8000". Of these outputs, the outputs of the AND gates 110 and 114 are in accord with the contents of the corresponding base address "8000" stored in each of the base address registers 111 and 115, and thus the comparator circuits 112 and 116 provide respective address decoded signals 118 and 120 of "1". This occurs because the address "80F0" bridges both the areas 202 and 203. The priority encoder 120 provides the address decoded signal 118 for the area 202 with priority.

The effects of the invention will be described in comparison to the prior art examples.

(1) The circuit scale is small with the same degree of freedom.

Figure 1:
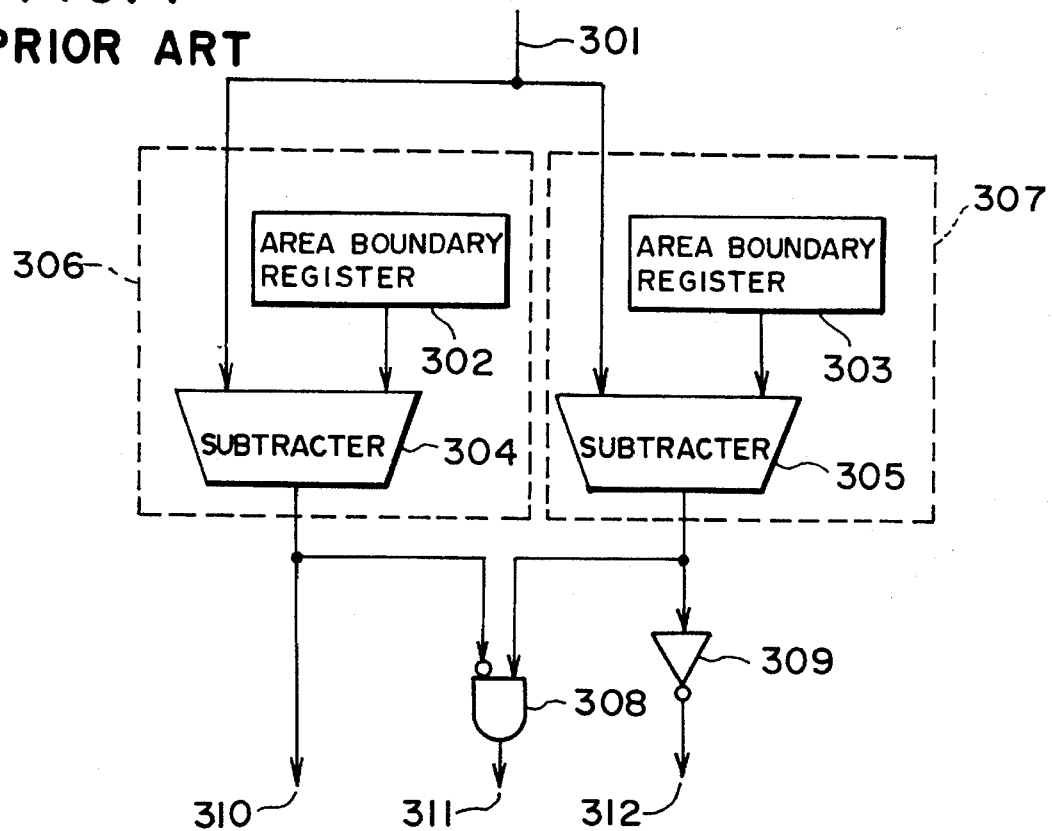
FIG. 1 is a block diagram showing an example of the prior art address decoder.

The address decoder used for the comparison is a 3-bit address decoder. In the prior art example 1 shown in FIG. 1, the circuit scale amounts to 50 gates in terms of NAND gates. The subtracter scale is smaller than the ALU (Arithmetic Logic Unit) having the same bit width because only the carry is used. However, with a further increase of the address area bit width, the subtracter size is increased dramatically. In contrast, the circuit according to the invention can be realized with only 21 gates. Further, with an increase of the address area bit width, the circuit scale is increased substantially in proportion to the address area bit number. It is thus possible to permit fine address designation of large areas.

(2) The address area has expansion capability.

While according to the invention and in the prior art, three address areas have been shown and explained in the above, it can be considered to additionally designate a large number of address areas for producing an upper-level compatibility system with respect to the current system. In this case, in the prior art example 1, it is not possible to secure new address areas without influencing the address decoding operation because of the absence of any address area which has not been decoded. In contrast, according to the invention, it is possible to define new address decoding areas in vacant areas while preserving the results of decoding of areas that have been already written.

As is seen, according to the invention, it is possible to realize an expansion to an upper-level compatibility system while maintaining the versatility of external hardware and registers.

(3) The degree of freedom of address areas is suited to actual devices.

Regarding the degree of freedom of address areas that can be designated, it is to be noted that, in the prior art example 1, there exists an address area designation rule for address areas that cannot be designated according to the invention.

Figure 2:
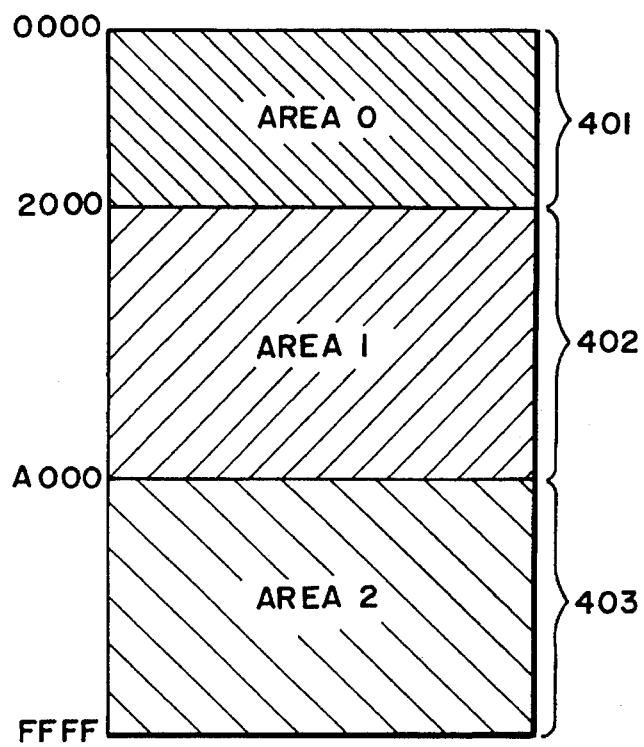
FIG. 2 is an example of address area allocation by the prior art address decoder.
Figure 3:
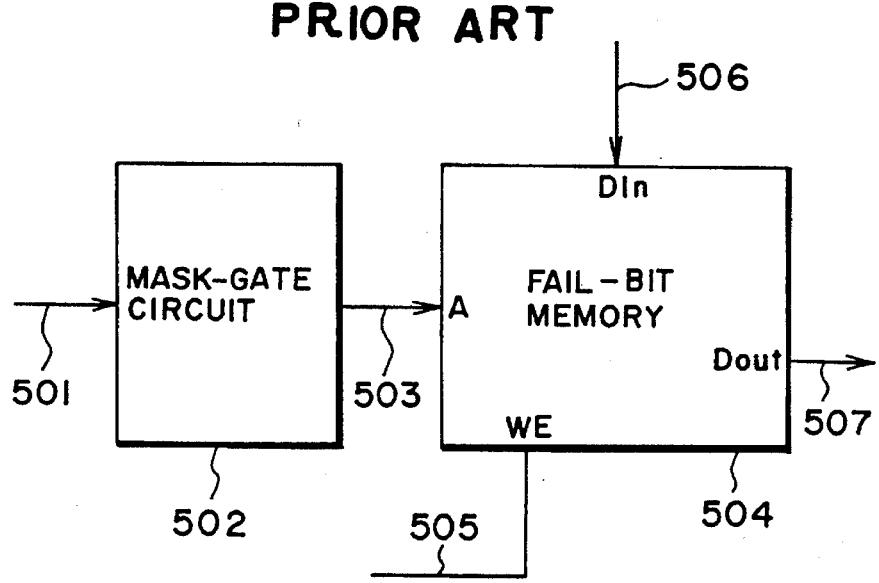
FIG. 3 is a block diagram showing another example of the prior art address decoder.
Figure 4:
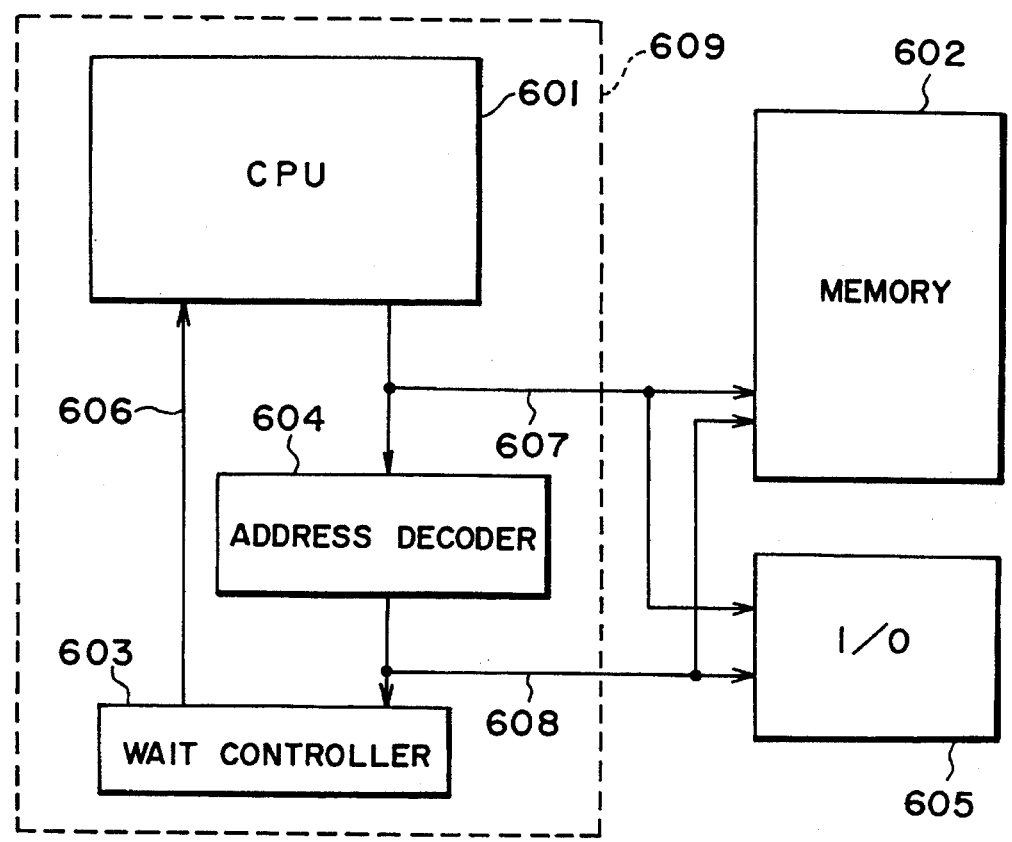
FIG. 4 is a block diagram showing an example of a system using the above prior art address decoder.

The address area designation rule as in FIG. 2 for the prior art cannot be realized in that form in the embodiment of the present invention. This is so because the address width of the area is restricted to a 2's factorial value at all times. In the actual system, however, the aim of address area designation is to inform a device, such as a specific memory, of the fact that the address assigned to the device has been accessed. The address space of a memory or an external device hardly has an address area with a width of a 2's factorial, and thus it is hardly needed to secure an address area with a width other than a 2's factorial value. This means that the designation of the area 1 or 2 in the prior art example 1 leads to a redundant area. Therefore, the address decoding has low expansion capability.

(4) The width of the degree of freedom of address area is large with the same circuit scale.

With the address space of a memory or an external device, the difference in the width of the order is extremely large. The prior art example 1 cannot directly cope with the address width digit difference of the memory or like device because of a subtracter bit number restriction. In contrast, according to the invention, it is possible to cope with a broad address width even with the same element number. Quantitatively, with an element number of 50 as gates, the degree of freedom is 3 bits in the prior art example 1. In contrast, according to the invention it is possible to obtain 7-bit address decoding. Besides, the difference is increased with increasing bit number.

In comparison to the prior art example 2, although it is the same in so far as the area designation made by address masking is concerned, according to the invention, two degrees of freedom can be provided for the point of start and the width of the area because it is possible to freely determine the start point of a start address of an area allocation.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An address decoder for decoding an address outputted from a processor, said address decoder comprising:

a base address register having a same bit length as said address to be decoded, for storing therein a value of a base address of a predetermined area in an address space;

a mask register having a same bit length as said address, for storing therein a mask value;

masking means for masking said address outputted from said processor for each bit with said mask value stored in said mask register; and a comparator for comparing a resulting value of masking conducted by said masking means and said value of the base address stored in said base address register to determine whether two compared values are in accord and for outputting an address decoded signal as a result of comparison, said mask value stored in said mask register being such that said resulting value of masking conducted by said masking means is in accord with said value of the base address stored in said base address register if the address outputted from the processor is an address within said predetermined area, wherein said masking means is an AND gate which takes a logical AND operation of each bit for said address outputted from said processor and an inverted value taken for each bit from said mask value stored in said mask register.

2. An address decoder for decoding an address outputted from a processor, said address decoder comprising:

a plurality of address comparator circuits provided for respective different areas in an address space, each of said plurality of comparator circuits including a base address register having a same bit length as said address from said processor, for storing therein a base address of a predetermined area in said address area;

a mask register having a same bit length as said address, for storing therein a mask value;

masking means for masking said address outputted from said processor for each bit with said mask value of said mask register;

a comparator for comparing a resulting value of masking conducted by said masking means and a value of said base address stored in said base address register to determine whether two compared values are in accord and for outputting an address decoded signal as a result of comparison; and a priority encoder which receives said address decoded signal from each of said address comparator circuits and outputs a final address decoded signal, and when a plurality of in-accord address decoded signals are received, outputs a highest priority address decoded signal as it is, and changes the remainder to out-of-accord, wherein said masking means is an AND gate which takes a logical AND operation of each bit for said address outputted from said processor and an inverted value taken for each bit from said mask value stored in said mask register.

* * * * *